March 5, 1968 | H. A. HELM | 3,372,376

ERROR CONTROL APPARATUS

Filed Oct. 5, 1964 | 2 Sheets-Sheet 1

INVENTOR
H. A. HELM
BY Lucian C. Canepa
ATTORNEY

March 5, 1968 H. A. HELM 3,372,376

ERROR CONTROL APPARATUS

Filed Oct. 5, 1964

2 Sheets-Sheet 2

United States Patent Office 3,372,376

Patented Mar. 5, 1968

3,372,376

ERROR CONTROL APPARATUS

Harry A. Helm, Morristown, N.J., assignor to Bell Telephone Laboratories, Incorporated, New York, N.Y., a corporation of New York Filed Oct. 5, 1964, Ser. No. 401,408
14 Claims. (Cl. 340—146.1)

ABSTRACT OF THE DISCLOSURE

A coding and error control apparatus is incorporated as common equipment in a transmission network containing a plurality of data lines, each of which transmits redundant information signals in accordance with a given error control format. The configuration and state of the apparatus are selectively variable in response to stored control words descriptive of the various error formats associated with the lines. Thus, for example, if information is received on a given line, gating signals derived from the control word associated with that line are applied to configure the apparatus so that decoding of the redundant information may be accomplished in accordance with the error format characteristic of that line. Similarly, the apparatus can be utilized in a multiline system to encode information in accordance with a selected error format associated with a given transmission channel.

This invention relates to information-processing systems and, more particularly, to the automatic control of errors in such systems.

In an information-processing system the goal of transmitting signals in an error-free manner is a formidable one whose attainment in practice often proves exceedingly difficult. It is, therefore, quite common to encode such signals in accordance with a suitable error-correcting code, whereby exact replicas of the original information signals can be abstracted from the coded signals despite their distortion by limited types of errors. Alternatively, such signals can be encoded in accordance with a suitable error-detecting code, whereby there is provided at a terminating station a positive indication of the error status of the original signals as received at the station.

Many different encoding and decoding techniques are known in the art. One such technique involves the use of so-called cyclic codes, and is characterized by great simplicity of design for the encoding and decoding equipment thereof. A typical information word encoded in accordance with a cyclic code may be regarded as a sequence of $n$ digits of which the first $n-k$ are information digits and the remaining $k$ are check digits. Cyclic codes are described, for example, by W. W. Peterson in his text entitled, "Error-Correcting Codes," pages 137–215, published jointly by The M.I.T. Press and John Wiley & Sons, Inc., 1961.

Another illustrative error control coding technique is described in my copending application Ser. No. 356,090, filed Mar. 31, 1964, now United States Patent 3,319,223, issued May 9, 1967. This technique deals with so-called character codes in which, for example, seven 3-bit information characters have appended thereto two 3-bit check characters. As described in the noted application, such codes are characterized by simplicity of implementation and, in addition, by powerful error-detecting and correcting capabilities.

The selection of an error control code for a particular information-processing system depends on many factors such as the error-occurrence statistics of the system, the over-all system reliability that is desired, cost and complexity considerations, and so forth. If such a system is connected to a plurality of incoming and outgoing channels each having different error characteristics and if, furthermore, the system is adapted to service a large class of customers each of whom has established different reliability standards for received and transmitted information, the selection of a single acceptable code for the multiline system becomes practically impossible. An obvious solution to the problem of providing a centralized encoding and decoding capability for such a multiline system involves providing appropriate coding equipment for each distinct line. However, this solution is highly wasteful of equipment and therefore expensive.

Another solution to the problem of providing error control in a centralized multiline information system is to have the error control function performed by the main computing equipment typically included therein. Frequently, however, this solution is disadvantageous in that the required error control processing time increases the over-all computing time of the system to a point at which the efficiency and capability thereof to perform other main processing functions are seriously affected.

Accordingly, an object of the present invention is the improvement of information-processing systems.

More specifically, an object of this invention is the provision of a multiline error control system in which the error control function is performed therein in a manner which requires a minimum amount of equipment and which is least disruptive of the operation of the system to perform its main processing functions.

These and other objects of the present invention are realized in a specific illustrative error control apparatus which is adapted to decode redundant information signals appearing on any one of a plurality of incoming lines. The decoding is accomplished in accordance with the particular error control formats respectively corresponding to the lines. The apparatus includes a memory unit which stores a plurality of control words each of which is associated with a different one of the lines. The presence of signals on a particular line is sensed by the apparatus and results in a control unit thereof directing a read out from the memory of the control word associated with the particular line. The read-out word is applied to a code translator and to a sequence controller which convert the word into a plurality of electrical signals which are applied to a configurable decoder. These signals configure the decoder and sequence its mode of operation for decoding the redundant information signals appearing on the particular line.

At the conclusion of the decoding operation the contents of the decoder are applied to a comparator wherein a determination is made of whether or not the received information was error-free. The comparator then notifies the control unit of the results of this determination. In turn, the control unit signals the processing equipment associated with the herein-described apparatus as to the error status of the information received on the particular line.

In a multiline decoding arrangement in which many lines require decoding, the illustrative configurable decoder made in accordance with this invention is advantageously time-shared among the incoming lines. In other words, the arrangement embodies the concept of performing the decoding for a particular line on a piece-by-piece basis. The partial decoding result for a particular line is stored in the memory and the relatively fast decoder is then available to decode information signals of another relatively low-speed incoming line. As noted above, this other line has associated with it in the memory unit a word representative of the error control format, if any, of the information appearing on the line. In addition, every line has stored in the memory unit a word representative of the previous decoding determination, if any. This latter word is applied to the decoder at the appropriate time to set it to exactly the same state it was in at the conclusion of the previous partial calculation for the associated line. A further partial calculation is then made by the decoder, and subsequently this result is also stored in the memory unit. This interchange between the decoder and the memory unit continues until the decoding operation for a particular line is completed. At that time the contents of the decoder are applied to the comparator, as described above.

The configurable decoder comprises a plurality of shift register stages and an associated number of gating circuits connected to the stages. Under the control of signals derived from the appropriate control word, incoming information signals are applied either in series or in parallel to the stages of the decoder. Also, the number of stages to be included in a particular decoding configuration is alterable under the control of the aforenoted signals. In addition, gating circuits are interposed between the decoder and the memory unit to selectively control the flow of information therebetween.

Thus, in accordance with the principles of the present invention, there is provided configurable common error control equipment for processing on a time-shared basis the signals appearing on a plurality of lines.

It is a feature of the present invention that error control apparatus include a coder which is selectively configurable and thereby suitable for processing signals in accordance with a variety of error control formats.

It is a further feature of this invention that a multiline error control apparatus include a memory unit for storing a plurality of control words each of which is respectively associated with one of the lines, and that the apparatus further include a configurable coder and conversion circuitry for translating a control word into gating signals which configure the coder to process information signals appearing on a particular line in accordance with a specified error control format.

A complete understanding of the present invention and of the above and other features and advantages thereof may be gained from a consideration of the following detailed description of an illustrative embodiment thereof presented hereinbelow in connection with the accompanying drawing, in which.

The principles of the present invention are applicable to both encoding and decoding apparatus. However, primary emphasis herein will be directed to a decoding embodiment of this invention. In this connection it is noted that in describing the invention, and in the claims, the term "coding" is used in a generic sense to encompass both encoding and decoding. The applicability of the principles of the invention to both aspects of coding will be apparent from the detailed description below.

Figure 1:
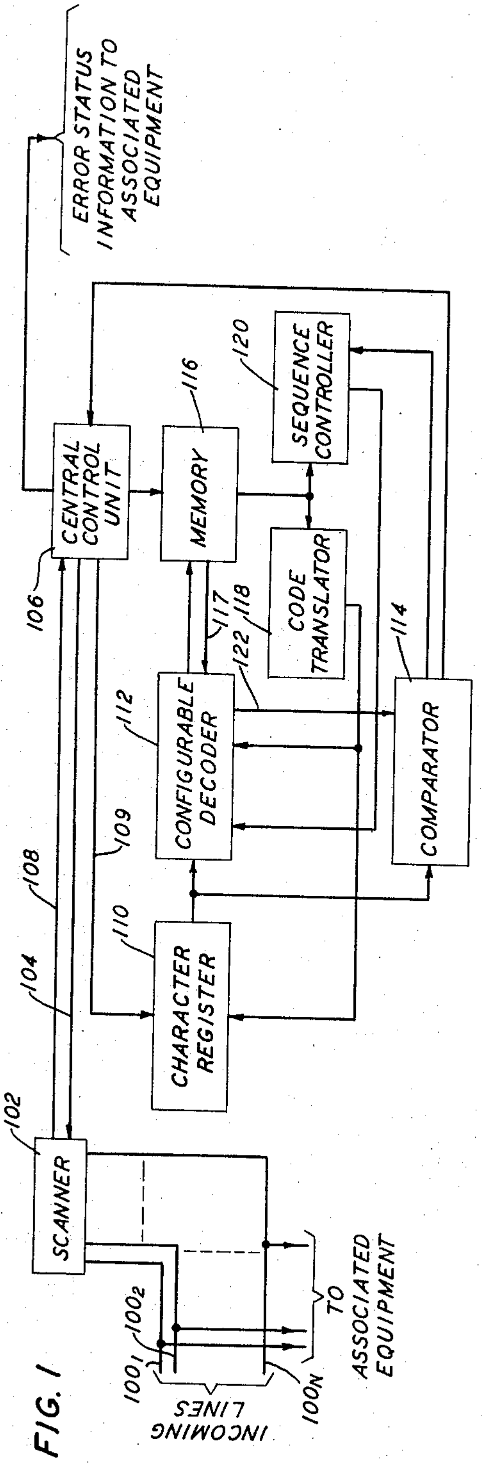
FIG. 1 shows a specific illustrative error control apparatus made in accordance with the principles of the present invention.

Referring now to FIG. 1, there is shown a specific illustrative error control apparatus made in accordance with the principles of the present invention. The apparatus is designed to decode redundant information signals which are applied to the apparatus via a plurality of incoming lines $100_1$, $100_2$ . . . $100_N$. (Typically these lines also extend to associated equipment which is adapted to perform main processing functions such as sorting, scanning, controlling and so forth.) Connected to the noted lines is a scanner 102 which, under the control of signals applied thereto via a line 104 from a central control unit 106, scans the incoming lines to ascertain the presence or absence of signals thereon. Upon detecting the presence of a signal on a particular line, the scanner 102 signals the unit 106, via a line 108, of the occurrence of this condition. Then the unit 106 in conjunction with the scanner 102 extract on a sampling basis the signals appearing on the particular line and apply them via a lead 109 to a character register 110 from which they are applied to a configurable decoder 112 and to a comparator 114.

The configurable decoder 112 is interconnected with a memory 116 which stores so-called control or error format words each of which is associated with a different one of the incoming lines $100_1$, $100_2$ . . . $100_N$. These control words are selectively read out of the memory 116 under the control of signals from the central unit 106, and are applied to a code translator 118 and a sequence controller 120. In turn, the units 118 and 120 convert the control word associated with a particular incoming line into a plurality of electrical signals which are applied to the decoder 112 to configure it and to sequence the over-all mode of operation thereof in accordance with the error coding employed on the particular specified line. Additionally, the output of the translator 118 is applied to the character register 110 to control the manner (series or parallel) in which information is applied from the register 110 to the decoder 112.

At the conclusion of a complete decoding operation the decoder 112 has stored therein an indicator word which is representative of whether or not the received information sequence processed by the FIG. 1 apparatus is error-free. This indicator word is applied via a lead 122 to the comparator 114 wherein a comparison takes place between the indicator word and a prestored reference word corresponding to an error-free information sequence. A signal representative of the result of this comparison operation is applied to the central control unit 106 which responds thereto to supply error status information to whatever processing equipment is associated with the depicted error control apparatus.

Illustratively, each received information sequence includes a so-called end-of-block indication. This indication is a unique signal, or group of signals, which are applied to the comparator 114 and recognized there as signifying that the end of the information digit portion of a redundant sequence has occurred. The comparator 114 responds to this indication by signaling the unit 120 to control the decoder 112 to continue the decoding operation for the check digit portion of the redundant sequence and then to gate the final decoding representation stored in the unit 112 to the comparator 114.

Advantageously, the decoder 112 shown in FIG. 1 is capable of high-speed operation relative to the rate at which signals appear on the incoming lines $100_1$, $100_2$ . . . $100_N$. Accordingly, the decoder 112 is time-shared among the noted lines such that the decoding of the redundant information appearing on any one line is accomplished in a number of discrete steps. For example, the decoding of signals appearing on the line $100_1$ may be carried out under the control of the sequence unit 120 for a predetermined interval of time, after which the unit 120 directs the decoder 112 to apply its contents to the memory 116. The decoder is then available to process signals which have already appeared on the other incoming lines $100_2$ . . . $100_N$ and which are stored in the character register 110. Subsequently, the unit 112 returns to the next step in the over-all decoding of the signals appearing on the line $100_1$. Before this next step is commenced, however, the decoder 112 is configured by signals from the code translator 118 to the particular form required for the error format associated with the line $100_1$, and the sequence controller 120 is set to generate the specific sequence of signals required by line $100_1$. In addition, by means of another word applied to the decoder 112 from the memory 116 via a lead 117, the unit 112 is restored to the exact state or signal condition it was in at the conclusion of the first step of the decoding associated with the line $100_1$. In this way the decoding of each of the incoming lines can be carried out on a piecemeal basis. Such repetitive partial decoding operations permit the illustrative high-speed error control apparatus to provide service to a large number of incoming lines in a highly efficient manner.

The particular manner in which the decoding apparatus described herein processes signals appearing on the incoming lines $100_1$, $100_2$ . . . $100_N$ can be understood more fully by reference to FIG. 3. During the time interval designated $T_1$ in FIG. 3 a signal sequence $s_1 \ldots s_n$ appears on the line $100_1$, no signals appear on the line $100_2$ and a signal sequence $i_1 \ldots i_n$ appears on the line $100_N$. As indicated above, the two sequences $s_1 \ldots s_n$ and $i_1 \ldots i_n$ are sampled and applied to the character register 110 under the control of the unit 106. During subsequent time intervals $T_2$ and $T_3$ other signal sequences, representing portions of complete redundant information codings, appear on selected ones of the incoming lines. These sequences are also applied to the register 110. After a predetermined number of signal sequence time intervals, for example three intervals, decoding of the sequences associated with the line $100_1$ commences. These sequences are applied from the register 110 to the configurable decoder 112 under the control of signals from the code translator 118. After the three sequences associated with the line $100_1$ have been decoded, the partial calculation corresponding thereto is stored in the memory 116. Then the sequences associated with the line $100_2$ and stored in the register 110 are applied to the decoder 112 for processing. In this way the initial three sequences appearing on each of the incoming lines are decoded in order. Subsequently, the error control apparatus returns to the decoding of the next set of sequences which appear on the first incoming line $100_1$.

Figure 3:
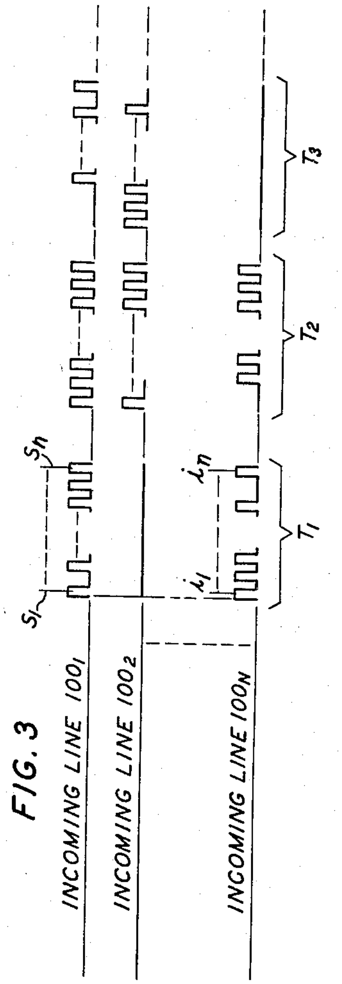
FIG. 3 is a timing diagram which is helpful in describing the over-all mode of operation of the arrangement shown in FIGS. 1 and 2.

Illustratively, the decoding operation for the initial three sequences appearing on the incoming lines takes place in a high-speed manner characterized by a basic decoding digit period which is a predetermined fraction of the digit period associated with the signals represented in FIG. 3. Hence the entire decoding process for all the lines can take place before the first signals of the fourth sequences appear on the respective incoming lines. Alternatively, the sampling of the fourth and following sequences appearing on the lines can occur in an overlapping mode of operation during a portion of the time in which the decoding of the initial three sequences is taking place. In this overlapping mode of operation the sampled signals are applied to the character register 110 for temporary storage there until the decoder 112 is available to commence processing them.

The scanner 102 included in the specific illustrative system embodiment depicted in FIG. 1 may, for example, comprise a unit of the type shown in FIGS. 99 and 100 of A. H. Doblmaier, R. W. Downing, M. P. Fabisch, J. A. Harr, H. F. May, J. S. Nowak, F. F. Taylor, and W. Ulrich copending application Ser. No. 334,875, filed Dec. 31, 1963. Additionally, the central control unit shown in detail in FIGS. 10 through 63 of the noted Doblmaier et al. application is well suited to perform the various control and signal-processing functions attributed to the unit 106 illustrated in FIG. 1 hereof. Furthermore, the memory 116 depicted in FIG. 1 and described above may, for example, comprise apparatus of the type shown in FIGS. 83 through 94 of Doblmaier et al.

Specific circuit details for the character register 110, the comparator 114, the code translator 118 and the sequence controller 120 are not given herein because their particular individual configurations are, in view of the functional end requirements therefor set forth above, considered to be straightforward to one skilled in the design of logic and memory circuits.

Figure 2:
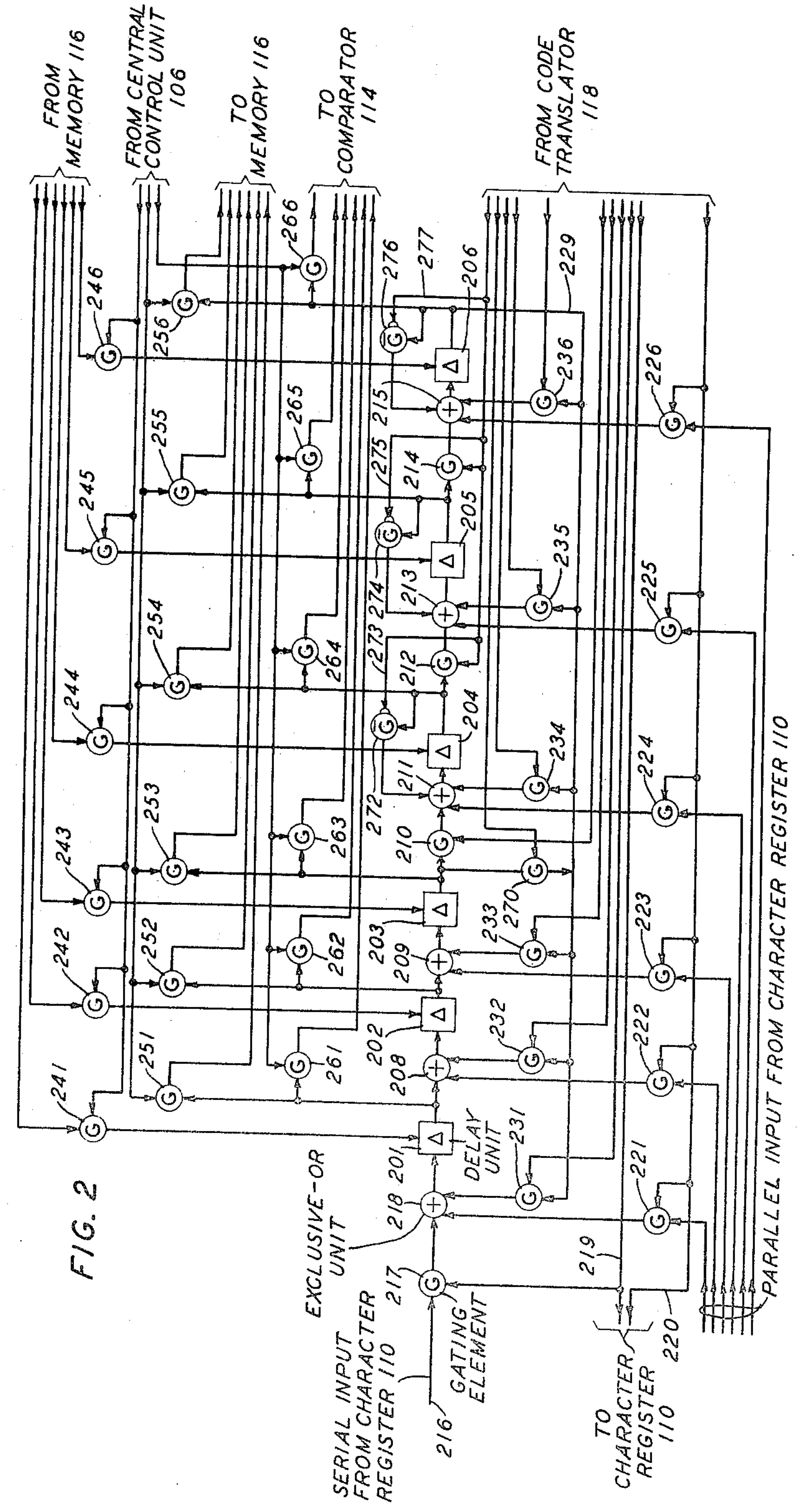
FIG. 2 depicts in detail the configuration of an illustrative decoder suitable for inclusion in the apparatus of FIG. 1.

The configurable decoder 112 shown in block diagram form in FIG. 1 is depicted in illustrative detail in FIG. 2. The decoder includes a plurality of units 201 through 206 each of which is adapted to delay signals applied thereto by a time interval which corresponds to the basic decoding digit period characteristic of the system shown in FIG. 1. Thus, for example, a signal applied during a first digit period to either one of the two indicated input leads of the delay unit 201 appears on the single designated output lead thereof during the next or second digit period.

Interposed between the first two delay units 201 and 202 is an EXCLUSIVE-OR unit 208. In addition, an EXCLUSIVE-OR unit 209 connects the output of the delay unit 202 to one input of the delay unit 203. Furthermore, connected between each adjacent pair of the units 203 through 206 is a series combination including a two-input gating element and an EXCLUSIVE-OR unit. Specifically, the gating element 210 and the EXCLUSIVE-OR unit 211 are connected in series between the output of the delay unit 203 and one input of the delay unit 204; the gating element 212 and the EXCLUSIVE-OR unit 213 are connected between the delay units 204 and 205; and the element 214 and the unit 215 are connected between the units 205 and 206.

The above-described arrangement of delay units, EXCLUSIVE-OR units and gating elements comprises a series-connected shift register arrangement. Serial signals appearing on an input line 216 are applied to this shift register via an input gating element 217 and an EXCLUSIVE-OR unit 218. The input line 216 is connected to the character register 110 shown in FIG. 1, and the element 217 is activated by control signals applied thereto from the code translator 118 via a lead 219. These signals from the translator 118 are also applied to the character register 110 to control it to apply its stored representations in a serial mode to the configurable decoder 112 via the line 216.

Alternatively, and again under the control of signals from the code translator 118, the character register 110 can be controlled to apply its stored representations to the described shift register arrangement in a parallel mode. Such control signals are applied to the register 110 via a lead 220. These signals also activate a plurality of gating elements 221 through 226 whose outputs are connected to the respective EXCLUSIVE-OR units associated with the inputs of the delay units 201 through 206, whereby the parallel output signals of the character register 110 can be gated simultaneously to the respective stages of the herein-considered shift register arrangement.

By means of a lead 229 the output of the last or rightmost delay unit 206 shown in FIG. 2 is applied via a plurality of feedback gating elements 231 through 236 to the respective EXCLUSIVE-OR units associated with the inputs of the delay units 201 through 206. In this way there is formed a generalized feedback shift register arrangement. By applying respective control signals from the code translator 118 to the gating elements 231 through 236, it is possible to activate selected ones of the elements 231 through 236 and thereby form a specific feedback shift register suitable for decoding a redundant information sequence encoded in accordance with a particular error control format. Specific feedback shift registers of this type, but without the powerful configurable capability of the one illustrated in FIG. 2, are known in the art, being described, for example, on page 115 of the aforementioned text by Peterson.

Also included in the specific illustrative decoder shown in FIG. 2 are a plurality of gating elements 241 through 246 by means of which signals representative of a previous partial decoding calculation are applied from the memory 116 to the delay units 201 through 206. These signals are gated to the units 201 through 206 under the control of the sequence controller 120, and serve to place the shift register arrangement in exactly the same state it was in at the conclusion of its previous decoding operation for a particular incoming line.

At the conclusion of the decoding time interval allotted by the central control unit 106 to a particular incoming line, the contents of the shift register arrangement shown in FIG. 2 are either gated back to the memory 116 via elements 251 through 256 or gated to the comparator 114 via elements 261 through 266. This selective gating action is controlled by signals applied to the decoder 112 from the sequence controller 120. In turn, the controller 120 determines whether to gate the contents of the shift register stages to the memory 116 or to the comparator 114 on the basis of control signals applied from the comparator to the controller, as described above and as indicated in FIG. 1.

Although a configurable decoder made in accordance with the principles of the present invention may include N stages, the specific arrangement shown in FIG. 2 includes only six stages. The configurable versatility of such a specific arrangement is illustrated by the ease with which the number of stages thereof can be varied. For example, assume that a three-stage feedback shift register of a specific configuration is required to decode a particular cyclic code. This configuring can be accomplished simply by simultaneously applying from the code translator 118 an activating signal to a gating element 270 and a deactivating signal to the element 210. The resulting three-stage shift register includes the delay units 201 through 203. Moreover, the pattern of feedback connections of this three-stage shift register can be controlled by selectively applying activating signals from the translator 118 to the feedback gating elements 231 through 233. In this illustrative way the configuration shown in FIG. 2 can be arranged to process a particular cyclic code characterized by three redundant digits. On the other hand, if a six-stage register is required for decoding purposes, the gating element 210 is activated and the element 270 is de-activated. Furthermore, by including a gating element between every adjacent pair of delay units, and by connecting an additional gating element to the output of every delay unit (in the manner in which the element 270 is connected to the output of the unit 203) the effective length of the shift register shown in FIG. 2 can easily be varied in unit-stage steps. An additional advantage of including a gating element between every adjacent pair of delay units is that the propagation of signals through the delay units can be thereby exactly controlled to prevent an overlap of signal states between two sequential decoding operations.

The specific illustrative configurable decoder shown in FIG. 2 also includes three complementary gating elements 272, 274 and 276. Each of these elements is identical to the other gating elements included in the arrangement described herein except that each includes a single input terminal (indicated by a half-circle) which responds to an activating signal by de-activating the associated element. The leads extending to these terminals are designated 273, 275 and 277. The operation of these complementary elements in decoding a particular redundant sequence is set forth in detail below.

To understand better the mode of operation of the above-described specific error control apparatus which illustratively embodies the principles of the present invention, let us consider a specific decoding example. Assume that there appears on the incoming line $100_1$ of FIG. 1 an information sequence encoded in accordance with a character code of the type described in my aforecited copending application. In particular, assume that there appear on the line $100_1$ in serial sequence in the following order:

(1) A plurality of three-digit information words,
(2) A unique three-digit end-of-block word, and
(3) Two three-digit check characters.

Although my noted copending application focused attention on a particular character code format having seven three-digit information words followed by two three-digit check words, it is emphasized that such a redundant sequence can be modified to include more or fewer information words (with a corresponding change in the error-detecting and/or correcting characteristics of the coded information). Herein, for illustrative purposes, it will be assumed that six three-digit information words and one end-of-block indicator word, followed by two check words, appear on the line $100_1$.

In response to the appearance of the above-described redundant information sequence on the line $100_1$, the scanner 102 and the central control unit 106 apply to the character register 110 the individual digits of a portion of the sequence. Additionally, as described above, the unit 106 directs a read out from the memory 116 of a control word characteristic of the error format associated with the incoming line $100_1$. Furthermore, the unit 106 directs the application from the memory 116 to the decoder 112 of a word representative of the previous decoding calculation, if any, associated with the line $100_1$. Assume for purposes of the specific example, that no previous calculation was effected and that, therefore, no signals are applied from the memory 116 via the gating elements 241 through 246 to the delay units 201 through 206.

The word read out of the memory 116 is converted by the code translator 118 and the sequence controller 120 to a plurality of electrical signals. These signals enable the gating elements 221 through 226 and direct the character register 110 to apply the representations stored therein to the decoder 112 in a parallel mode. The three digits of the first three-digit information word are respectively applied via the gating elements 221 through 223 to the EXCLUSIVE-OR units 218, 208 and 209. At the same time these three digits of the first information word are respectively applied via the elements 224 through 226 to the units 211, 213 and 215. One digit interval later, the next-following three-digit information word is simultaneously applied to the units 218, 208 and 209 and to the units 211, 213 and 215. Assume that this decoding process is terminated after three of the information words have been so applied to the delay units of FIG. 2. The representations appearing at the respective outputs of the units 201 through 206 are then gated via the elements 251 through 256 to the memory 116 and temporarily-stored there. Subsequently, when the illustrative apparatus returns to the decoding of the incoming line $100_1$, the temporarily-stored word is returned from the memory 116 to the delay units 201 through 206 via the gating elements 241 through 246 in the form of electrical signals which set the delay units to the exact states their outputs were in at the termination of the previous decoding calculation.

Additionally, the decoder 112 is configured under the control of signals from the code translator 118 to process the particular character code format associated with the line $100_1$. Then the respective digits of the fourth three-digit information word of the herein-assumed redundant sequence are simultaneously applied to the units 218, 208 and 209 and to the units 211, 213 and 215.

During the decoding of the particular character code assumed herein, the arrangement shown in FIG. 2 operates as two distinct three-stage shift register arrangements each of which is in effect recalculating one of the three-digit check words included in the code format. In particular, the stages which include the units 201 through 203 are involved in the process of recalculating a check word comparable to $y_2$ defined by Equation 11 of my aforecited copending application, and the stages which inclue the units 204 through 206 recalculate a check word comparable to $y_1$ defined by Equation 10 of the noted application. Finally, after six information words have been applied to the delay units 201 through 206 in the aforedescribed piecemeal manner, the seventh three-digit word is recognized by the comparator 114 as the end-of-block or indicator word which signifies the end of the information word portion of the redundant sequence. In response to this occurrence, the controller 120 is signaled by the comparator to continue the sequencing of the decoding operation for one additional cycle. During this additional cycle, the three-digit check word corresponding to $y_1$ is applied by the character register 110 to the delay units 204 through 206, and the three-digit check word corresponding to $y_2$ is applied by the register 110 to the units 201 through 203. As is clear from the description of the parity recalculation process contained in my copending application, the results stored in the shift registers at this point of the decoding operation are indicative of whether or not the received redundant sequence is error-free. These results are gated via the elements 261 through 266 to the comparator 114 wherein they are compared with prestored words representative of the decoding of a correctly-received information sequence. Based on this information, the comparator 114 makes a determination of the error status of the decoded sequence and transmits to the central control unit 106 a signal indication thereof.

During the aforedescribed decoding of the specific illustrative character code, the gating element 210 shown in FIG. 2 was de-activated, thereby to divide the arrangement shown in FIG. 2 into two distinct three-stage shift registers. Additionally, the elements 270 and 231 were activated to permit the output of the delay unit 203 to be recirculated via the unit 218 back to one input of the unit 201. As a result of this selective gating action, one check character of the $y_2$ type specified in the noted copending application was recalculated. Further, the gating elements 212, 214 and 234 through 246 were disabled during the decoding of the particular code assumed herein, and the elements 272, 274 and 276 were enabled during that time. By controlling the gating elements associated with the units 204 through 206 in this way, there is generated a simple, iterative sum of the information words. As specified in my noted copending application, such as iterative process is effective to calculate the check character $y_1$.

It is well known that longitudinal and spiral parity codes are actually special cases of character codes. Such codes can, therefore, also be coded in a straightforward manner in accordance with the principles and by means of the apparatus described herein. Furthermore, the principles of this invention are additionally applicable to the coding of so-called convolutional codes which are also well known in the art. Longitudinal and spiral codes are, for example, described on page 81 of the noted Peterson text. Convolutional codes are described in "Threshold Decoding," by J. L. Massey, M.I.T. Press, 1963.

As specified above, the illustrative error control apparatus shown in FIGS. 1 and 2 is also selectively configurable to code variable length cyclic codes of various known forms. Moreover, the apparatus is suitable to code cyclic formats even if the number of information digits thereof is increased or decreased over the number which is characteristic of a natural cyclic code for a specified number of check digits.

Although emphasis herein has been directed to redundant sequences which include end-of-block indicator words, it is noted that alternative formats not including such words are also capable of being coded in accordance with the principles of the present invention. For example, fixed-length redundant sequences can be coded by the error control apparatus described herein simply by adding circuitry thereto to count the number of received digits of a particular sequence and to signal the comparator 114 upon the receipt by the apparatus of a predetermined number of digits of the sequence.

As indicated above, the principles of this invention are also clearly applicable to the encoding of information signals which appear on a plurality of incoming lines. In such an encoding apparatus a memory unit stores a word characteristic of the error control format into which the information signals appearing on a particular line are to be encoded. The memory unit stores one such characteristic word for each different line and, as in the decoding examples considered above, the encoding can be carried out by a configurable encoder on a time-shared basis in response to signals derived from the characteristic words.

Finally, it is to be understood that the above-described arrangements are only illustrative of the application of the principles of the present invention. Numerous other arrangements can be devised by those skilled in the art without departing from the spirit and scope of this invention. For example, although the main emphasis hereinabove is directed to error control apparatus designed to process error-detecting codes, it is apparent that the configurable decoding equipment described above can be adapted to process error-correcting codes of various types.

What is claimed is:

1. In combination, a coder whose configuration is selectively variable to process signals coded in accordance with a plurality of error control formats, means for storing character words respectively associated with said formats, means responsive to a read-out from said storing means of any selected one of said words for applying control signals to said coder to configure it in accordance with the corresponding error control format, and means connected to said storing means for applying signals thereto to cause a read-out therefrom of any selected one of said words.

2. Apparatus for coding signal sequences which appear on a plurality of lines having error control formats respectively corresponding thereto, said apparatus comprising means for storing control words respectively representative of the error control formats associated with said lines, a configurable coder, means responsive to signals appearing on a particular line for reading out of said storing means the particular control word associated with said particular line, and means responsive to the read-out of said particular word for selectively configuring said coder and controlling the over-all sequence of operations thereof for coding the signals appearing on said particular line.

3. Apparatus as in claim 2 further including a character register connected to said coder.

4. Apparatus as in claim 3 wherein said reading-out means comprises a scanner connected to said lines and a central control unit connecting said scanner to said storing means, and means connecting said character register to said central control unit.

5. Apparatus as in claim 4 wherein said configuring and controlling means includes a code translator unit connecting said storing means to said character register and to said configurable coder.

6. Apparatus as in claim 5 wherein said configuring and controlling means further includes a sequence controller unit connecting said storing means to said coder.

7. Apparatus as in claim 6 wherein said configurable coder comprises a decoding unit.

8. Apparatus as in claim 7 further including a comparator unit connected to said character register and to said decoding unit for determining the error status of the signals processed by said decoding unit and for providing an indication thereof.

9. Apparatus as in claim 8 further including means connected to said decoding unit for applying to said storing means signals representative of the partial decoding calculation associated with a particular line.

10. Apparatus as in claim 9 still further including means responsive to said reading-out means for applying signals to said decoding unit to set said unit in a predetermined state representative of the previous partial decoding calculation associated with a particular line.

11. In combination in an apparatus for coding information signals which appear on a plurality of lines having error formats respectively corresponding thereto, a linear array comprising N interconnected shift register stages, first gating means adapted to be controlled by a first control signal for applying said information signals in a serial mode to the first stage of said array, second gating means adapted to be controlled by a second control signal for applying said information signals in a parallel mode to the respective stages of said array, feedback means including means connecting the last stage of said array to the first stage thereof, said feedback means further including third gating means comprising N gating elements connected between said connecting means and the respective stages of said array.

12. A combination as in claim 11 further including means connected to said N gating elements for applying enabling signals to selected ones thereof, whereby the configuration of said feedback means can be selectively varied.

13. A combination as in claim 12 further including control means connected to said first and second gating means for respectively applying first and second control signals thereto, whereby the mode in which said information signals are applied to said array from said supplying means can be selectively varied.

14. A combination as in claim 13 further including a plurality of gating elements respectively connected between adjacent pairs of selected stages, fourth gating means for applying the respective outputs of selected ones of said stages to said connecting means, and means for controlling the enabling of said plurality of gating elements and of said fourth gating means, whereby the number of stages included in said shift register array can be selectively varied.

References Cited

UNITED STATES PATENTS

| | | | |
|---|---|---|---|
| 3,155,818 | 11/1964 | Goetz | 235—153 |
| 3,267,460 | 8/1966 | Merrell et al. | 340—347 |

MALCOLM A. MORRISON, *Primary Examiner.*

C. E. ATKINSON, *Assistant Examiner.*